Figure 1:
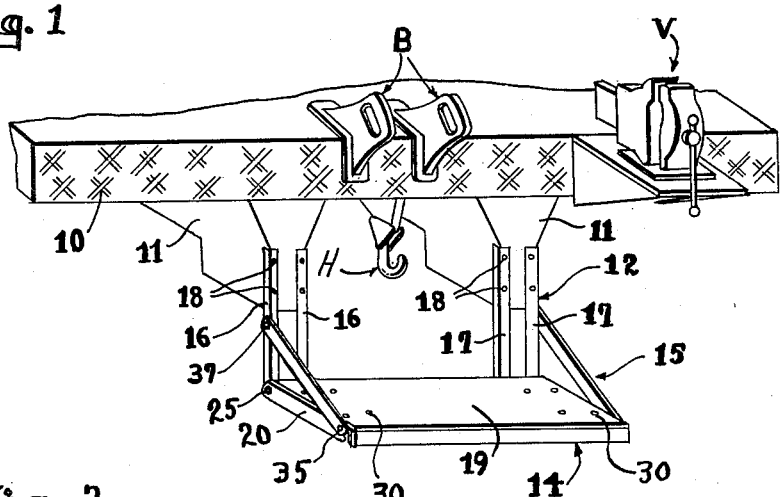

March 7, 1961 J. S. BARNHART 2,973,826
RETRACTABLE STEP STRUCTURE FOR VEHICLES
Filed Dec. 10, 1957 2 Sheets-Sheet 1

INVENTOR.
John S. Barnhart
BY
Attorney

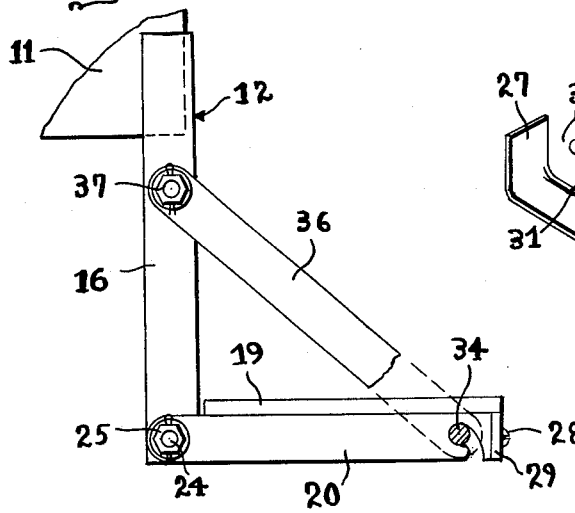
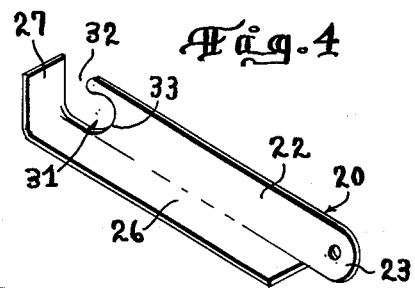
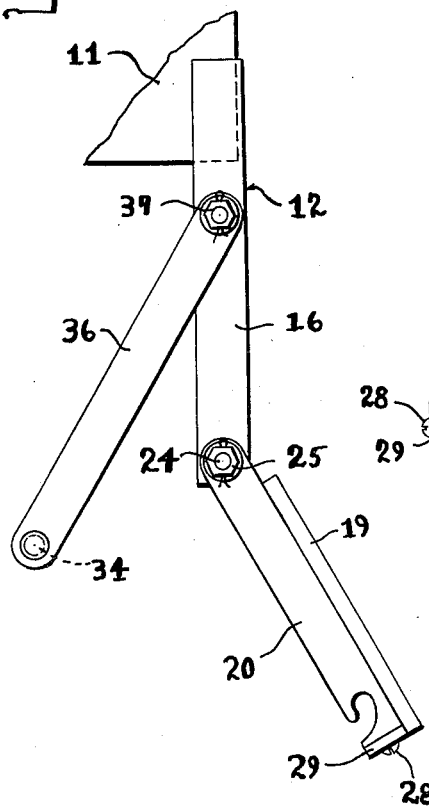
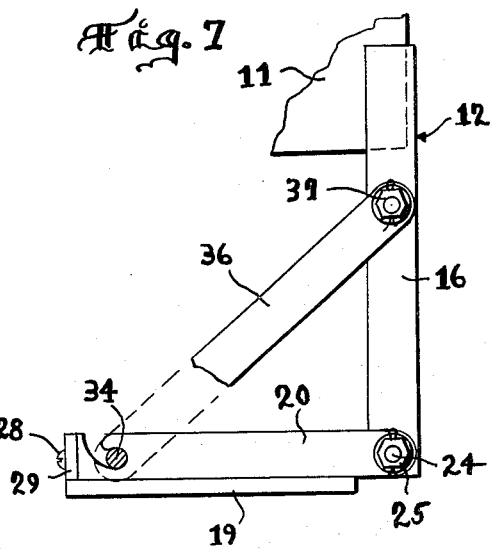

2,973,826
Patented Mar. 7, 1961

2,973,826
RETRACTABLE STEP STRUCTURE FOR VEHICLES

John S. Barnhart, R.D. 2, Bethel Road,
West Middlesex, Pa.

Filed Dec. 10, 1957, Ser. No. 701,893

2 Claims. (Cl. 182—91)

My invention relates to foldable bracket-like structures, more particularly to foldable step structures for vehicles and the like, and the principal object of my invention is to provide new and improved structures of this character.

My invention is particularly adapted for use as a step structure for trucks such as are used by utility companies in their service work; however, although the invention will be hereinafter disclosed primarily in connection with such use, it will be understood that the invention is not limited thereto.

Figure 2:
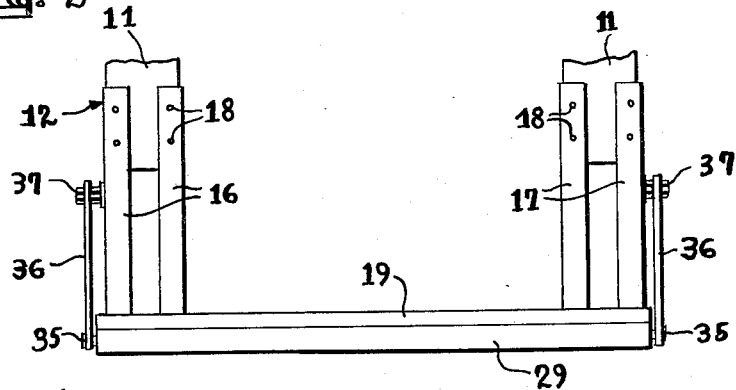
Figure 3:
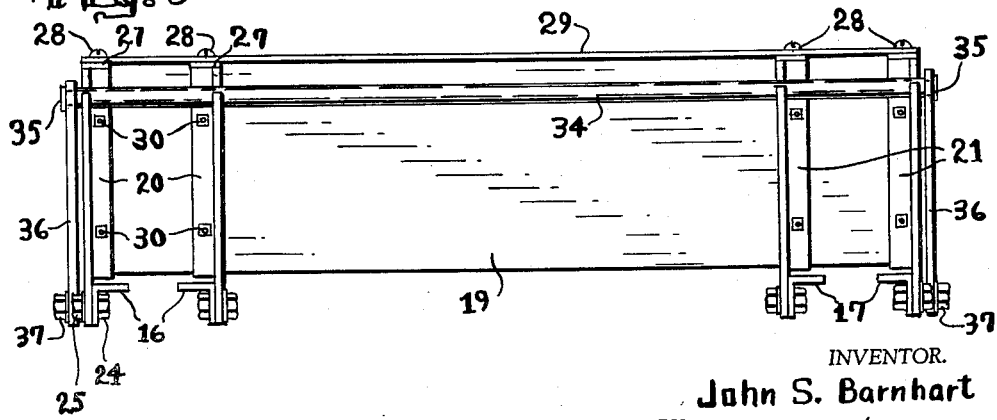

In the drawings accompanying this specification and forming a part of this application, there is shown, for purposes of illustration, an embodiment which my invention may assume, and in these drawings:

Figure 1 is a perspective view of a preferred embodiment of my invention shown in position at the rear of a utility truck, the latter being fragmentarily shown, Figure 2 is an elevational view of the structure shown in Figure 1 as it would appear looking from the rear of the truck, Figure 3 is a bottom plan view of the structure, drawn to a larger scale, Figure 4 is a perspective view of a part of the structure, and Figures 5, 6 and 7 are end views of the structure illustrating disposition of parts in their various positions.

The usual utility truck is designed to provide a work shop on wheels to enable a service man to accomplish most of the repair work encountered in the ordinary service work. Accordingly the usual truck includes a vise V for obvious use, a hook H for use in towing objects, such as poles, cable drums and the like, and brackets B for supporting objects, such as a boom pole. Additional tools and repair parts are carried within the truck and accordingly a step structure is usually provided at the rear of the truck to enable a workman to easily enter or leave the truck.

However, service trucks usually had a fixed non-folding step at their rear and it has been found that such step interfered with the free use of the hook H and often times was damaged when the hook H or brackets B were used in their intended manner. Folding step structures have heretofore been proposed but such structures also interfered with free use of the hook H and therefore were not widely used.

My invention provides a folding bracket-like structure which ideally suits the requirements for use with utility trucks in that the structure may be folded out of the way and in protected manner under the truck bed and therefore is not subject to damage or provides the interference above noted.

The usual service truck comprises a bed 10 supported from a chassis (not shown) through a pair of longitudinally extending spaced-apart beams 11, 11. It has been found that the usual spacing of the beams provides ideal anchoring places for my improved step structure and the disclosed embodiment is thus supported, although it will be appreciated that my structure may be supported elsewhere on the truck.

Generally, the embodiment herein disclosed comprises support means 12 preferably secured to the beams 11, 11 in pendent manner, base means 14 and holding means 15 shiftably connected to the support means.

More specifically, the support means 10 herein disclosed comprises pairs of angle iron members 16, 16 and 17, 17, each pair being secured to a respective beam 11, 11 in any suitable manner, such as by bolts 18, or by screws, welding, or the like (not shown).

The base means, in the embodiment disclosed, is preferably formed as a step which, in one of its positions extends horizontally and rearwardly of the truck in the required manner. The step may be formed of metal, or a combination of metal and a traction providing surface, such as wood and, as herein shown, the step is formed of a board 19 which provides the upper step surface and pairs of supporting angle members 20, 20 and 21, 21 (see especially Figure 3).

The angle members 20, 21, for purposes of production, are preferably of similar construction and the ones in each pair are of opposite hand, although they may be of the same hand, if desired. One web 22 of each angle member (see especially Figure 4) provides an apertured ear 23 which is pivotally connected to a respective angle iron member 16, 17, as by means of bolts 24 and nuts 25, the latter preferably being pinned to the bolts to prevent their unintentional disassembly.

The other web 26 of each angle member 20, 21 is formed with a down-turned toe 27. As best seen in Figure 3, the toes 27 are aligned, and each is provided with a threaded aperture to receive the shank of a machine screw 28, whereby a trim or kick plate 29 may be secured in relation spanning the toes 27 and in position substantially flush with the adjoining edge of the board 19. The angle members may be secured to the board 19 and in properly spaced relation by means of nuts and bolts 30.

The web 22 of each angle member 20, 21 is formed with a bayonet-type slot 31 to provide an entrance opening 32 adjoining the toe 27 and a seat portion 33 spaced inwardly from the toe. As best seen in Figure 3, the bayonet-type slots are aligned and therefore correspondingly receive a cross-rod 34 which forms part of the holding means of the embodiment herein disclosed.

The cross-rod 34 traverses all of the angle members 20, 21 and has end portions 35, 35 which extend beyond the outermost angle members 20, 21. Each end portion 35 may be of reduced diameter to pass through an aperture in the lower end of a respective one of a pair of links 36 and thereafter headed over to securely hold the link against displacement axially of the cross-rod 34. The upper end of each link 36 is pivotally secured to the outermost ones of the angle members 16, 17, as by means of nut and bolt connections 37 and here again the nut is pinned to the bolt to prevent unintentional disassembly.

Figures 1 and 5 best show my improved folding step structure when the parts are relatively disposed to provide a rigid step at the rear of the utility truck. In the position shown, the base or step 14 is disposed substantially horizontally and extends outwardly from the rear of the truck. The cross-rod 34 is securely received in the seat portion 33 of the bayonet-type slot 31 formed in each of the angle members 20, 21. The entrance openings 32 of each slot 31 is directed downwardly and therefore the cross-rod 34 cannot be easily unintentionally displaced from the slots 31.

When the step is not in use, as when the truck is being driven to and from the work area, or when the truck is used to tow a pole or cable, the base or step 14 may be easily folded out of the way. To remove the step 14 from its position shown in Figures 1 and 5, it is merely necessary to slightly lift the same so that the cross-rod 34 rides forwardly in the respective bayonet-type slots 31 to alignment with the entrance opening 32 of such slots.

The cross-rod 34 and its supporting links 36 may then be rotated downwardly about the pivots 37 so that the rod 34 is removed from the slots 31. The links 36 may hang straight downwardly from the supports 16, 17 and in Figure 6 these links are shown beyond center to clear parts which otherwise would be hidden from view.

The supported base or seat 14 will also tend to rotate to a straight downward position and it may be rotated along the lines of the arrows shown in Figure 6 toward the horizontal position shown in Figure 7, wherein the base or seat 14 is folded under the truck bed.

As the base or seat is rotated toward the position shown in Figure 7, the edge margins of the web 22 of each of the angle members 20, 21 will engage the cross-bar 34 and cam along the latter to swing the links 36 slightly upwardly of the horizontal position of the seat shown in Figure 7. When the cross-rod reaches the entrance openings 32 of the slots, it will drop down into the slots (since the entrance openings now face upward) and a slight downward movement of the base or seat 14 will dispose the cross-bar 34 in seated relation within the seat portion 33 of each slot 31. The base 14 will now be held in its retracted relation out of the way of interference and damage.

To return the seat 14 from its position in Figure 7 to its position in Figure 5, it is merely necessary to slightly elevate the seat so that the cross-rod 34 aligns with the entrance openings 32 of the slots 31. The seat may now be rotated in a counterclockwise direction free of the cross-rod 34 and the latter may also be rotated counterclockwise to underlie the entrance openings 32 of the slots 31 when the seat 14 is slightly beyond horizontal position. When the seat 14 is lowered to horizontal position, the cross-rod 34 may be moved to seated disposition in the seat portions 33 of the slots 31.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A retractable step structure for a vehicle and the like, comprising a support attached to a part of said vehicle, a step pivotally secured to said support and freely swingable about its pivot axis through an arc of substantially 180° from one horizontal position extending outwardly of said vehicle and laterally from one side of said support to another horizontal position extending inwardly of said vehicle and laterally from an opposite side of said support, holding means pivotally secured to said support and freely swingable about its pivot axis through an arc intersecting the plane of said step arc at said two positions, and interlocking means for detachably interlocking said step and said holding means at either of said two positions, said interlocking means comprising a bayonet slot and a keeper rod carried respectively by said step and by said holding means.

2. A retractable step structure for a vehicle and the like, comprising a pair of support members attached in spaced pendent manner to a part of said vehicle, a step extending cross-wise of said support members and pivotally secured to each for freely swinging movement through an arc of 180° around a lower portion of said support members from one position extending laterally from one side of said support members to another position extending laterally from the opposite side of said support members, said step having a pair of spaced vertical ribs extending radially to the pivot axis of said step, each rib having a bayonet type slot formed therein, a pair of rigid links each having one end pivotally secured to a respective outer side of said support member, a cross-rod extending between the opposite ends of said links and secured thereto, said link pair being freely swingable through an arc intersecting the plane of said step arc at said positions to dispose said cross-rod in holding engagement within said bayonet-type slots in either position of said step.

References Cited in the file of this patent

UNITED STATES PATENTS

| | | |
|---|---|---|
| 1,792,586 | Higgins | Feb. 17, 1931 |
| 2,249,403 | Stollsteimer | July 15, 1941 |
| 2,500,559 | Miller | Mar. 14, 1950 |
| 2,516,237 | Morse | July 25, 1950 |
| 2,850,561 | Bauman et al. | Sept. 2, 1958 |

FOREIGN PATENTS

| | | |
|---|---|---|
| 171,697 | Great Britain | Nov. 16, 1921 |
| 316,003 | Great Britain | July 25, 1929 |